(12) United States Patent
Regensburger et al.

(10) Patent No.: US 12,508,080 B2
(45) Date of Patent: Dec. 30, 2025

(54) PATH PREPARATION SYSTEM FOR PREPARING A PATH FOR A DEVICE

(71) Applicant: Siemens Healthcare GmbH, Erlangen (DE)

(72) Inventors: Alois Regensburger, Poxdorf (DE); Tobias Lenich, Nuremberg (DE); Rebecca Fahrig, Mohrendorf (DE)

(73) Assignee: Siemens Healthineers AG, Forchheim (DE)

( * ) Notice: Subject to any disclaimer, the term of this patent is extended or adjusted under 35 U.S.C. 154(b) by 187 days.

(21) Appl. No.: 17/841,823

(22) Filed: Jun. 16, 2022

(65) Prior Publication Data

US 2022/0401155 A1    Dec. 22, 2022

(30) Foreign Application Priority Data

Jun. 17, 2021  (DE) .................. 10 2021 206 179.6

(51) Int. Cl.
| | | |
|---|---|---|
| A61B 8/00 | (2006.01) | |
| A61B 10/02 | (2006.01) | |
| A61B 17/22 | (2006.01) | |
| A61B 34/20 | (2016.01) | |
| A61B 34/30 | (2016.01) | |
| A61B 17/32 | (2006.01) | |

(52) U.S. Cl.
CPC ............ *A61B 34/20* (2016.02); *A61B 8/4209* (2013.01); *A61B 10/0233* (2013.01); *A61B 17/22004* (2013.01); *A61B 34/30* (2016.02); *A61B 2017/320069* (2017.08); *A61B 2034/2063* (2016.02)

(58) Field of Classification Search
CPC ....... A61B 34/20; A61B 34/30; A61B 8/4209; A61B 8/0841; A61B 10/0233; A61B 17/22004; A61B 17/3403; A61B 2017/320069; A61B 2017/00694; A61B 2017/3413; A61B 2034/2063; A61B 2034/107; A61B 2034/2055; A61B 2034/2051; A61B 2090/3764; A61B 2090/376; A61B 2090/378; A61B 18/20; A61B 2018/00577; A61N 7/00; A61N 7/02

See application file for complete search history.

(56) References Cited

U.S. PATENT DOCUMENTS

| | | | |
|---|---|---|---|
| 2008/0221448 A1* | 9/2008 | Khuri-Yakub | A61B 90/36 600/439 |
| 2013/0204138 A1 | 8/2013 | Belohlavek et al. | |
| 2015/0335919 A1 | 11/2015 | Behar et al. | |

(Continued)

FOREIGN PATENT DOCUMENTS

WO    WO-2020234070 A1 *  11/2020  ......... A61B 17/3403

*Primary Examiner* — Michael J Carey
*Assistant Examiner* — Zainab Mohammed Aldarraji
(74) *Attorney, Agent, or Firm* — Lempia Summerfield Katz LLC (57) ABSTRACT

A path preparation system for preparing a path for a device. The path preparation system includes an ultrasound transmitter and a tracking system. The tracking system is configured to determine a current position of the device on the path. The ultrasound transmitter is configured to focus an ultrasound wave onto a focus position that lies in front of the device in the direction of the path, in spatial relation to the current position of the device.

18 Claims, 4 Drawing Sheets

(56) References Cited

U.S. PATENT DOCUMENTS

| | | | |
|---|---|---|---|
| 2016/0220393 A1* | 8/2016 | Slivka | A61F 2/44 |
| 2017/0042521 A1 | 2/2017 | Popovic et al. | |
| 2020/0093505 A1 | 3/2020 | Sinelnikov et al. | |
| 2020/0164231 A1* | 5/2020 | Cannata | A61N 7/00 |
| 2020/0405403 A1 | 12/2020 | Shelton, IV et al. | |
| 2022/0061932 A1* | 3/2022 | Visser | A61B 8/4245 |

\* cited by examiner

PATH PREPARATION SYSTEM FOR PREPARING A PATH FOR A DEVICE

CROSS REFERENCE TO RELATED APPLICATIONS

This application claims the benefit of DE 102021206179.6 filed on Jun. 17, 2021, which is hereby incorporated by reference in its entirety

FIELD

Embodiments relate to a path preparation system for preparing a path for a device and a method for preparing a path of a device using a path preparation system.

BACKGROUND

It is known to feed in or move a device along a path to a target region or target position. The target position is located inside the target region. The path runs in a material. For an intervention or a medical intervention in the target region, the device is meant to be fed in or moved along the path. The material in which the path runs is tissue in this case. The device is pushed through the tissue up to the target position. For example, the device may be a medical device, for instance a biopsy needle or a catheter. In this case, the intervention may be a biopsy or drainage, for example. Many further interventions using a suitably configured device are known and conceivable.

The device may include a sharp tip. This tip bores the path up to the target position as a result of the device being fed in. For example, the path is thereby bored into the tissue. In addition, typically the device must not be too bulky in order to reduce complications while the device is being fed in, for instance resulting from bleeding, and to ensure straightforward feeding-in. The device must typically also be rigid in order to facilitate boring through the tissue. Thus, it is typically not possible to use a flexible device, for instance, to follow a curved or bent path that allows a detour around a critical region, for instance of higher risk of bleeding. Any injury caused by the device inside a critical region, for instance a critical organ, may increase the risk of bleeding from the intervention.

The target position may lie inside an organ, for example. This requires using the device to bore through the relevant organ or to penetrate into the organ. The organ may slide away when the device penetrates into the organ. This may lead to an increased risk of bleeding and/or more difficult positioning of the device in the target region on the target position. An organ movement may make it harder for the device to hit the target position exactly.

BRIEF SUMMARY AND DESCRIPTION

The scope of the present disclosure is defined solely by the appended claims and is not affected to any degree by the statements within this summary The present embodiments may obviate one or more of the drawbacks or limitations in the related art.

Embodiments provide a system that may be used to prepare a path of a device according to a current position of the device in order to make it easier to feed in or move the device along the path.

Embodiments relate to a path preparation system for preparing a path for a device. The path preparation system includes an ultrasound sensor and a tracking system. The tracking system is configured to determine a current position of the device on the path. The ultrasound transmitter is configured to focus an ultrasound wave onto a focus position, that lies in front of the device in the path direction, in spatial relation to the current position of the device.

The device may be a medical device. For example, the device may be a biopsy needle, a guidewire, an implant, an endoscope, or a catheter. In embodiments the device may include a guide instrument for inserting a radiation source or beam source for brachytherapy. Alternatively, the device may be a needle, a scalpel, a surgical trocar, a drainage tube, or a stent.

The device may be rigid or inflexible. Alternatively, the device may be flexible or pliable.

The device may be configured to perform an intervention in a target region. For example, the device may be configured for sample-taking, for example for a biopsy, or for drainage, or for catheterization, or for a transjugular intrahepatic portosystemic shunt (TIPS) procedure in a liver, or for a surgical procedure, or for cannulation in endoscopic retrograde cholangiopancreatography (ERCP), or for placing a stent, or for placing trocars during a laparoscopy, or for brachytherapy etc. in the target region. The intervention may be sample taking, for example a biopsy, or drainage, or catheterization, or a transjugular intrahepatic portosystemic shunt (TIPS) procedure in a liver, or a surgical procedure, or cannulation in endoscopic retrograde cholangiopancreatography (ERCP), or placing a stent, or placing trocars during a laparoscopy, or brachytherapy.

The device may include an elongated shape. For example, the device may include an at least approximately cylindrical shape. For example, the diameter of the base surface of the cylindrical shape may be substantially smaller than the height of the cylindrical shape. For example, the height may be ten times, twenty times, fifty times, or one hundred times the diameter. The device may be arranged on a guidewire. The device may include a tip. The tip is the distal segment, or the foremost part, of the device. The device may include a sharp tip. In this case, the sharp tip may be configured to penetrate a material, for example tissue. Alternatively, the device may include a blunt tip. Alternatively, or additionally, the tip of the device may be curved or bent. The tip may be curved in comparison with the rest of the device. For example, the tip may be formed into a curve. The tip may include a variable curvature.

The curvature of the tip may be varied or adjusted manually or automatically. It is hence possible to vary an orientation of the tip or of the device.

The device may be configured to be introduced at least partially into the material. The device is configured to be arranged at least partially in the material. For example, the device is configured to be arranged on the path in the material.

The path leads from a starting point to a target position in the target region.

The target region may be, for example, an accumulation of fluid, or a tumor, or a location for a biopsy, or an organ, etc. The target position lies inside the target region. The intervention may be performed by the device at the target position.

The path may include been planned in advance. The path may include been planned in advance as part of path planning. Alternatively, the path may be planned or adjusted in real time, in other words while the device is being fed into the target position, according to the current position of the device. The path runs through the material. For example, the path may run through tissue. For example, the tissue may be human or animal tissue. The path may run in a patient. The patient may be a person or an animal. The path may be configured to detour around one or more critical regions or sites, for instance an anatomical object. The path may be configured such that the device does not penetrate or cross one or more critical regions unless necessary. For this purpose, the path may run at least partially in a curve. A critical region may be a region of increased risk of bleeding and/or an organ, for example.

The path planning may take into account possible deformation of a surrounding material by the device inserted into the path. This may take place by taking into account a material parameter relating to the torsional strength and/or deformability of the device, and/or a parameter of the material surrounding the path.

The tracking system is configured to determine the current position of the device. For example, the tracking system is configured to determine the current position of the device on the path or relative to the path. For example, the tracking system may also determine a deviation of the current position from the path. The tracking system may be configured to determine the current position by imaging and/or by optical tracking and/or by electromagnetic tracking.

The current position of the device is given by the tip of the device. The current position is determined in the material. For example, the current position may be determined according to the starting point and the target position. The location of the current position may be determined relative to the starting point and the target position. For example, the current position may be determined relative to the path. The path may be preplanned.

The current position may take into account, for example, a curvature of the tip. The current position may take into account whether the tip is pointing in a different direction than the rest of the device. The current position may include information about an orientation of the tip of the device.

In embodiments the device may be moved by a robotic system or robotically. For example, the device may be moved along the path by the robotic system. For example, the tracking system may then include the robotic system. For example, the robotic system may provide information about the current position of the device. For example, the robotic system may provide information about a longitudinal position of the device. The robotic system may provide information about how far the device has already been fed in or moved along the path. Alternatively, or additionally, the robotic system may provide information about an orientation or curvature of the tip of the device. For example, the robotic system may provide information about a future-planned curvature or orientation of the tip. The robotic system may provide the current position.

The ultrasound transmitter is configured to emit a high-intensity focused ultrasound (HIFU) wave. For example, the ultrasound wave emitted by the ultrasound transmitter may be focused electronically. The ultrasound transmitter may be coupled to the material (for instance the tissue) in which the path runs. For example, the ultrasound transmitter may be coupled to the material via a coupling medium. For example, the coupling medium may be an aqueous component, for instance a gel. The ultrasound transmitter may be moved or positioned for example robotically. The ultrasound transmitter may be moved or positioned by a robotic system. For example, the ultrasound transmitter may be positioned robotically relative to the path.

The high-intensity focused ultrasound wave is configured to perforate the path in the material through which the path runs. The high-intensity focused ultrasound wave may lower or reduce at its focus point a material density or a material strength of the material through which the path runs. For example, the high-intensity focused ultrasound wave may increase an elasticity of the material and/or cause the material to liquefy. The path may thereby be perforated by the high-intensity focused ultrasound wave.

The high-intensity focused ultrasound wave is focused onto a focus. The focus lies on the focus position on the path. The focus position is arranged on the path in front of the device. "In front of" means in this case that the focus position lies in a region on the path that is arranged between the tip of the device and the target position. The path may be defined or predetermined. Alternatively, the path may be determined or adjusted or corrected according to the current position. For example, the focus position may be arranged relative to the current position of the device according to the curvature or the orientation of the tip of the device.

The focus position may be determined according to an organ movement etc. In other words, motion correction, for instance of the organ movement, may be performed by adjusting the focus position to suit the organ movement. For example, the time at which the high-intensity focused ultrasound wave is emitted may depend on an organ movement. The time at which the high-intensity focused ultrasound wave is emitted may depend on a phase of the organ movement. The organ movement may be captured by a tracking system. For example, the tracking system may capture a physiological signal that describes the organ movement. The tracking system may capture an electrocardiogram, for instance, from which a current phase of the heart movement may be derived. Alternatively, the tracking system may capture a medical image, for example, from which may be derived a phase or a state of the organ movement of an organ shown in the image. The organ movement may be, for example, movement of the heart, movement of the lungs or of organs adjacent to the lungs that is caused by respiration, and/or movement of a digestive organ caused by digestion, etc.

The focus position lies in front of the device in such a way that the tip of the device may be fed in from the current position to the focus position. The focus position lies in front of the device in a way that ensures that the device takes the shortest route between the current position and the focus position when fed in.

The spatial relationship between the current position and the focus position is given by the spatial relation. The spatial relation may take into account, for example, that the device is able to move from the current position to the focus position. The spatial relation may also take into account, for example, an orientation or curvature of the tip of the device. For example, the spatial relation may take into account an asymmetry of the tip. Alternatively, or additionally, the spatial relation may take into account a material strength, for example. The spatial relation may take into account how close to one another the focus position and the current position must be in order that the device may be moved from the current position to the focus position. Alternatively, or additionally, the spatial relation may take into account a location of one or more critical regions. The spatial relation may be configured such that the focus position is arranged relative to the current position such that there is no unnecessary injury to a critical region.

The emission of the high-intensity focused ultrasound wave may take into account shadowing by the device. For example, this may take into account an effect of the shadowing on the ultrasound wave and the associated change in intensity in the focus, and a possible spatial shift in the focus. For example, the ultrasound transmitter may include an array of individual transmit elements or transducer elements. Each transmit element may be configured to emit a partial ultrasound wave. The partial ultrasound waves may then interfere to produce the high-intensity focused ultrasound wave. For example, only those transmit elements whose partial ultrasound wave is not shadowed by the device may emit a partial ultrasound wave. In other words, only the transmit elements whose emitted partial ultrasound wave does not pass through the device on the direct route to the focus position may emit partial ultrasound waves.

The high-intensity focused ultrasound wave may be used to perforate the path. It may thereby be ensured that the device follows the path. For example, it is no longer necessary that the device has a sharp tip to bore through or cut through the material in which the path runs. it is possible to position the focus position such that no critical region is injured. A risk of bleeding or a risk of injury to an organ may thereby be reduced, for example. The path may run in any curve for this purpose. A flexible device may be used that may follow the curved path. If the device is meant to penetrate into an organ, it is possible to prevent the organ sliding away by using the high-intensity focused ultrasound wave to pre-perforate the path beforehand. For example, the device causes less deformation to a material in which the path runs if the path is already perforated by the ultrasound wave.

According to one aspect, a histotripsy system includes the ultrasound transmitter.

The histotripsy system is configured to perform histotripsy. The histotripsy system includes an ultrasound therapy transducer and an ultrasound imaging transducer and a coupling medium. The ultrasound waves may be introduced into the material, For example into the body of the patient or into the tissue, via the coupling medium, for example a water bath. The ultrasound waves emitted by the ultrasound imaging transducer are used for imaging. In this process, at least one medical image may be produced. The ultrasound waves emitted by the ultrasound therapy transducer are used for the histotripsy treatment. For example, the ultrasound therapy transducer may emit the high-intensity focused ultrasound wave. The ultrasound therapy transducer forms the ultrasound transmitter.

The tracking system may include the ultrasound imaging transducer. The current position of the device may be determined on the basis of the medical image.

A histotripsy system is suitable for preparing the path for the device. the histotripsy system may provide the high-intensity focused ultrasound wave.

According to a further aspect, the tracking system includes an imaging unit. The imaging unit is for example one of the following units: a C-arm unit, an angiography unit, an ultrasound imaging unit.

Alternatively, the imaging unit may be a computed tomography unit, a magnetic resonance tomography unit, a mammography unit, an X-ray unit, a positron emission tomography (PET) unit and/or a single photon emission computed tomography (SPECT) unit. The ultrasound imaging unit may correspond to the ultrasound imaging transducer described above.

The imaging unit is configured to capture a medical image. The imaging unit is configured to capture in the medical image the device, for example the tip of the device. For this purpose, at least the tip of the device may be treated with a contrast agent, for example. Alternatively, at least the tip of the device may be made of a material that is visible in the medical image. For example, the imaging unit may be configured to identify or localize a marker pattern on the device. For example, the marker pattern may be configured such that it may be seen or shown or recognized in the medical image. The marker pattern may be arranged, For example, on the tip or close to the tip of the device.

The medical image may be a two-dimensional or a three-dimensional medical image. The medical image may show the tip of the device in two dimensions or in three dimensions.

On the basis of the medical image, the current position of the device may be determined by the tracking system. The current position may be determined in an automated manner by image processing, for example. Alternatively, or additionally, the current position may be determined by applying a trained function to the medical image. The current position may be determined by machine learning or deep learning. For this purpose, the device, or at least the tip of the device, may be segmented in the medical image.

In addition, an area surrounding the device may be analyzed in the medical image. For example, critical regions may be determined in the medical image. In other words, it may be determined from the medical image where the path is allowed to run. For example, the tracking system having the imaging unit may be configured to identify, for example in an automated manner, a critical region along the path, for example in an area surrounding the focus position.

If a temporal sequence of medical images is captured by the imaging system, a movement, for instance an organ movement, may be analyzed or observed. For example, the high-intensity focused ultrasound wave may then be emitted according to the movement. The emission of the high-intensity focused ultrasound wave may take into account the organ movement in the sequence of medical images.

In embodiments the imaging unit may be configured to monitor the high-intensity focused ultrasound wave or the focus position, and, if applicable, adjust the ultrasound parameters (for instance intensity, pulse length, pulse frequency) or the focus position.

The current position of the device may be determined in a medical image captured by an imaging unit. Time-resolved observation of the current position is thereby possible. Moreover, critical regions may be determined in the medical image. For example, a movement or change over time of a critical region may be observed in a temporal sequence of medical images. It is thereby possible to plan the emission of the high-intensity focused ultrasound wave. The time at which the high-intensity focused ultrasound wave is emitted, and the focus position of the high-intensity focused ultrasound wave, depend on the current position of the device and on the critical regions or on the movement thereof. These may be determined in the medical image or in the sequence of medical images.

According to an embodiment, the tracking system includes an ultrasound imaging unit. In this case, the ultrasound imaging unit and the ultrasound transmitter are registered to each other.

The histotripsy system may include the ultrasound imaging unit and the ultrasound transmitter, as described above. For example, the ultrasound transmitter may be formed by the ultrasound therapy transducer. For example, the ultrasound imaging unit may be formed by the ultrasound imaging transducer.

Registered means that the ultrasound transmitter knows the region that is shown in the medical image by the ultrasound imaging unit. The ultrasound transmitter and the ultrasound imaging unit are spatially registered or aligned or coupled to each other. For example, the ultrasound transmitter and the ultrasound imaging unit are registered in a common coordinate system. For example, this then allows the ultrasound transmitter to be focused automatically onto the tip of the device or onto the focus position in front of the tip of the device.

It is thereby possible to speed up the path preparation. For example, the high-intensity focused ultrasound wave may be emitted instantly after the current position is determined, without the need for time-consuming spatial alignment of the ultrasound transmitter relative to the ultrasound imaging unit.

According to a further aspect, the tracking system is configured to determine a direction and/or a speed of movement of the device.

The movement of the device describes the feeding-in of the device in the material. The feeding-in may include a translation and/or rotation of the device, for example of the tip of the device. The expression "the direction or speed of movement of the device" shall be considered below to be synonymous with the expression "the direction or speed of the device." In addition, the direction and the speed of the device refer to the tip of the device. The speed or the direction of the device specifies the speed or direction respectively of the tip of the device.

The direction specifies in which direction the device is moving, or in which direction it is being fed in. The direction may relate here to the path segment already traveled. The direction relates to the path segment that the device has already traveled or through which it has already been fed in. For example, the direction relates to the segment last traveled by the device. The direction may describe from which direction, or with what orientation, the device was moved to the current position. For example, the direction may specify an orientation of the tip of the device relative to the guidewire on which the device is arranged.

The speed specifies analogously the speed at which the device is fed in. The speed specifies the speed of the device before reaching the current position. For example, the speed may specify the speed of the device at which the device reaches the current position. The device may be fed in continuously. Alternatively, the device may be fed in in stages, each time from the current position to the focus position.

For example, the direction and/or the speed of the device may be derived or determined from a series, for example a temporal series, of current positions. The direction may be derived from a spatial change in the current position of the device. The speed may be derived from a spatial change over time in the current position of the device.

In embodiments, the direction may be determined on the basis of a sequence of medical images. In embodiments, the direction and/or the speed may be determined on the basis of a temporal sequence of medical images.

For example, the medical image, or the medical images in the (temporal) series or sequence of medical images, may be in two-dimensional or three-dimensional form.

Knowing the direction and/or the speed is helpful in planning the intervention. For example, it may be inferred from the direction and/or the speed the time at which the target position is reached in the target region, in which the intervention is meant to be performed. For example, a deviation of the device from the path may be identified from the direction and/or the speed. the path may be planned or updated or adjusted on the basis of the direction and/or the speed. the knowledge of the direction and/or the speed may be used to adjust the feeding-in of the device, for instance according to an organ movement.

According to a further aspect , the spatial relation of the focus position to the current position of the device depends on the speed and/or the direction of movement of the device.

The spatial relation depends on the feeding-in of the device, or of the tip of the device, in the material.

The focus position may depend on the direction of movement of the device. The spatial relation may be used to take account of whether, depending on the direction of the device, the device may be fed in or moved to the focus position starting from the current position. For example, the spatial relation may define how far a direction of a connecting line between the current position and the focus position is allowed to deviate from the direction of the device. Alternatively, or additionally, the spatial relation may define, for an assumed direction and/or path, that the focus position is at a distance of 1 mm or 3 mm or 5 mm or 10 mm or 15 mm or 20 mm from the current position.

Alternatively, or additionally, the focus position relative to the current position may depend on the speed of movement of the device. In this case, the focus position may be chosen such that, depending on the speed and the current position, the device reaches the focus position in a certain time interval. In other words, for a higher speed, the focus position may be at a further distance from the current position than for a lower speed. The spatial relation may define the time interval, for instance. For example, the spatial relation may define that the device reaches the focus position in 0.1 s or in 0.5 s or in 1 s, assuming movement or feeding-in at the determined speed.

The spatial relation may be configured such that movement of the device is substantially continued. The focus position relative to the current position may be arranged such that the movement of the device may be continued. The movement of the device is defined here by the direction and/or the speed.

Alternatively, the spatial relation may be configured so as to correct a path deviation. The focus position relative to the current position may be chosen or arranged so as to correct a possible deviation of the device, or of the current position of the device, from the preplanned path. For example, the path deviation may be identified or detected by the direction and/or speed and/or by comparing the current position with the path.

The choice of the focus position may take into account whether the device, depending on its direction, is configured to reach the focus position from its current position, or to be moved or fed into this focus position. The more flexible the device, the further the direction of the connecting line between the current position and the focus position may deviate from the direction of movement of the device. The focus position may be chosen such that the device may reach the focus position at the determined speed within a certain time interval. This may prevent the distance between the current position and the focus position being unnecessarily small, and an unnecessarily large number of high-intensity focused ultrasound waves being transmitted or focused into the material. This would waste time unnecessarily. In addition, given too small a distance, at the time at which the high-intensity focused ultrasound wave is emitted, the current position of the device may correspond at least approximately to the focus position. This may lead to the device being destroyed by the high-intensity focused ultrasound wave. Too large a distance, on the other hand, may lead to the device no longer following the defined path during feeding-in, because the perforation by the high-intensity focused ultrasound wave is too coarse. Too large a distance may also cause the device to get stuck in the material between the current position and the focus position. By defining the spatial relation, it is possible to correct a path deviation, for instance as a result of a technical imperfection and/or as a result of an organ movement and/or as a result of an organ deformation and/or as a result of a deformation of the device.

In certain embodiments, the size of the focus and/or an intensity and/or pulse rate of the high-intensity focused ultrasound wave may be adjusted according to the speed and/or direction of movement of the device. The size of the focus may describe, for example, a spatial extent and/or a shape of the focus of the high-intensity focused ultrasound wave.

In certain embodiments, the size of the focus and/or the intensity and/or the pulse rate may be adjusted to suit a (material) property of the device and/or a property of the material in which the path runs. The path preparation system may receive a preoperative or intra-operative dataset including the (material) property (for instance an elasticity, density, etc.), and be configured to adjust the ultrasound parameters along the path according to the (material) properties.

According to a further aspect, the spatial relation and/or the focus position may be defined manually.

The spatial relation and/or the focus position may be defined by an operator, for example a doctor or a medical assistant. The operator may define or provide the spatial relation and/or the focus position via an input unit. For example, the input unit may be a keyboard, a computer mouse, a touchscreen and/or a touchpad.

The spatial relation may include, for example, a minimum and/or maximum time interval in which the device may be moved at the determined speed from the current position to the focus position. Alternatively, or additionally, the spatial relation may include a maximum deviation between the direction of the connecting line between the current position and the focus position and the direction of movement of the device. Alternatively, or additionally, the spatial relation may include a fixed distance that the focus position is meant to have in relation to the current position on the path. The operator may manually define the maximum and/or minimum time interval and/or the maximum deviation and/or the fixed distance.

Alternatively, or additionally, the operator may define the focus position. For example, the focus position may be defined in the form of coordinates. The coordinates may be defined relative to the current position or relative to the coordinates of the target position or relative to the path. If the manually defined focus position and/or spatial relation deviates from the preplanned path, the path planning may be updated or adjusted on the basis of the defined focus position. Alternatively, or additionally, the operator may select the focus position in the medical image. In this case, the current position of the device is shown in the medical image. In embodiments the preplanned path may be superimposed in the medical image. The operator may then select or define in the medical image the focus position. For example, the operator may define the focus position by clicking or pressing in the medical image on the relevant point by a computer mouse or on a touchpad or on a touchscreen.

Defining the spatial relation and/or the focus position manually allows a flexible response to unexpected circumstances. For instance, the selection of the focus position may be adjusted to suit a patient. Alternatively, or additionally, an instant response to bleeding or an anatomical risk structure in a critical region is possible by detouring around the bleeding site and selecting an alternative path. A flexible response may be made to a necessary change in the path compared with the planned path, for instance caused by an organ movement or a deformation of an organ. The planned path may be based on a pre-intervention planning dataset, for instance an image dataset. For example, as a result of an altered placement or positioning of the patient, the information obtained using the pre-intervention planning dataset may differ from the current information, for instance about a shape of an organ. For example, this may make it necessary to adjust the path and hence to adjust the focus position, or the spatial relation between current position and focus position.

According to a further aspect, the ultrasound wave is emitted onto the focus position only if none of the following events occurs: the current position of the device corresponds to a target position of the path, or a segment of the path on which the current position lies is marked as critical in path planning, or a user input prevents the emission of the ultrasound wave.

The ultrasound transmitter emits the high-intensity focused ultrasound wave only when none of the aforementioned events occurs.

For example, automatic emission of the ultrasound wave is stopped by the specified events. For example, manual emission of the ultrasound wave by the operator may be possible.

If the current position of the device corresponds to the target position of the path, further movement or feeding-in of the device is unnecessary or unwanted. For example, the intervention may then be performed. At the target position, the path has reached its endpoint.

The path may include been planned in advance, or preplanned, as described above. The path may be divided into segments in this process. The segments may also be classified. For example, a segment of the path may be marked or classified as critical if feeding-in or moving the device in this segment is likely to increase the risk of bleeding, and/or if an organ movement has a strong influence on the segment. For example, a segment may be classified as critical if it crosses a critical region or runs close to a critical region.

If the device is configured to perform brachytherapy, radiation treatment planning may be carried out in advance in association with the path planning. In the radiation treatment planning, a spatial dose distribution may be determined. For example, critical regions may be marked in this process. The aim is, if at all possible, to expose the critical regions to no radiation dose, or to only a small radiation dose, during insertion and/or removal of the radiation source by the device along the path. A segment of the path that runs along a critical region of this kind may be classified as critical.

The classification may be based on a medical image captured prior to intervention. The classification may be performed manually by the operator. Alternatively, or additionally, the classification may be carried out in an automated manner, for instance by applying a trained function. For example, in a critical region, the ultrasound wave may be emitted only if the operator gives clearance for this. In other words, automatic emission of the high-intensity focused ultrasound wave may then be stopped.

Alternatively, or additionally, regions through which the path may run, or close to which the path may run, may be marked, or classified as critical. As described above, the classification may also be carried out manually and/or in an automated manner on the basis of a medical image captured prior to intervention. In proximity to a critical region, it is necessary to hit the focus position particularly precisely.

Otherwise, for example, there may be an increased bleeding risk and/or injury to an organ. The corresponding segment of the path that runs in the critical region or adjoins the critical region may then be marked as critical. For example, the high-intensity focused ultrasound wave is then not emitted in an automated manner. For example, manual interaction by the operator is then needed.

The operator may stop the emission of the ultrasound wave by a user input. For example, the operator may stop the emission of the high-intensity focused ultrasound wave if a complication arises, for instance bleeding. For example, the operator may stop the emission of the high-intensity focused ultrasound wave if he discerns in the medical image that the preplanned path must be corrected. For instance, this may be the case if an abnormality is discernible in the medical image and/or if an object, for example an organ or a tumor, is moving more strongly than expected, etc.

The aforementioned events may trigger a protection mechanism that stops an emission of the high-intensity focused ultrasound wave or does not allow this emission until a manual input by the operator. It is thereby possible to minimize or reduce a risk caused by a potentially incorrectly emitted high-intensity focused ultrasound wave.

According to a further aspect, the device includes a biopsy needle.

The biopsy needle may be configured for tissue removal. The biopsy needle may be a hollow needle, for instance. The biopsy needle may be rigid or flexible. The biopsy needle may include a sharp tip or a blunt tip. In embodiments the biopsy needle may be arranged on a guidewire.

Using the path preparation system, a biopsy may be performed in a simplified manner. For example, the path preparation system may be used to prepare the path for the biopsy needle. it is thereby possible to prevent the biopsy needle from injuring critical regions or critical tissue or critical organs.

According to a further aspect, the path runs in a material. The focused ultrasound wave produces at the focus position a lesion having a reduced material strength.

For example, the material may be the tissue. The material may be human or animal tissue. Alternatively, the material may be any other material through which the device is meant to be fed in or moved from the starting point to the target position.

A lesion is produced at the focus of the high-intensity focused ultrasound wave. In other words, a lesion is produced at the focus position by the ultrasound wave. The lesion is characterized in that the material strength, or a material density of the material is reduced at the site of the lesion. For example, the ultrasound wave reduces a strength of the tissue at the site of the lesion, i.e., at the focus position, if the material is tissue.

The ultrasound wave may displace the material at the focus position. The lesion then constitutes a cavity in the material. Alternatively, the ultrasound wave may liquefy the material. Alternatively, the ultrasound wave may alter the material at the focus position in terms of its consistency in such a way that, in comparison with the surrounding material, it has a lower resistance to penetration or piercing or boring-through by the device. For example, the material may be altered in such a way that it has a greater elasticity at the site of the lesion.

In other words, a reduced material strength may mean liquefaction or displacement or greater elasticity.

A lesion that acts like a perforation may be produced by the high-intensity focused ultrasound wave. reducing the material strength may make it easier to feed in the device. it may hence be achieved that during the feeding-in, the device moves on the path and does not come off the path, because the device will follow the path of least resistance, i.e., of lowest material strength.

According to a further aspect, at least a portion of a channel from the current position of the device to the focus position is formed by the lesion.

A route or connection between the current position of the device and the focus position is partially perforated by the lesion. The channel acts as a perforation. The channel is formed with lower material strength through the lesion. The channel may include the entire connection between the current position and the focus position. Alternatively, the channel may include only a subsegment of the connection between the current position and the focus position. In embodiments, the channel may end at the focus position. In embodiments, the current position may be separated from the channel by a segment of material of normal strength. For example, the segment of material of normal strength between the current position and the focus position may be so thin that the device may break through or bore through the segment easily.

The path may be defined by the channel. It is sufficient if at least one subsegment between the current position and the focus position is in the form of a channel. This subsegment may act as a perforation. It is then possible to speed up the perforation of the entire path because the number of ultrasound waves may be reduced if only a portion of the channel is formed.

According to a further aspect, the path is prepared according to the current position of the device by a plurality of lesions on the basis of a plurality of focus positions.

The entire channel may be prepared as described above iteratively. In this process, after the lesion is produced at the focus position by the high-intensity focused ultrasound wave, the device may be fed in or moved from its current position to the focus position. The focus position then corresponds to the current position of the device. On the basis of this new current position, a new focus position may be determined in spatial relation to the new current position. The high-intensity focused ultrasound wave may be focused and emitted onto the new focus position. This produces a lesion at the new focus position. By moving or feeding-in the device to the new focus position, this position again becomes the current position of the device. This method may be repeated iteratively until the focus position corresponds to the target position in the target region. The device may thereby be fed in up to the target position. Alternatively, the method may be interrupted or terminated as a result of other events described above.

The entire path of the device may be prepared iteratively by the above-described process. the iterative procedure allows the path to be adjusted flexibly at any time. For example, the path may be adjusted when the above-described events, for which emission of the ultrasound wave is interrupted, occur. In addition, the path may be adjusted, for example, if bleeding occurs. Furthermore, the emission of the high-intensity focused ultrasound wave may be adjusted to an organ movement. The ultrasound wave may be emitted when the corresponding organ is in a suitable movement state. It may hence be achieved either that the device does not injure the corresponding organ, in other words the lesion lies outside the organ, or that it is ensured that the device makes a clean entry into the corresponding organ. The iterative preparation of the path allows a flexible response to the different movement states.

By preparing a curved path in combination with a rigid device, the material, for example the tissue, may be pulled into a desired shape. The material may be deformed as desired if the rigid device is pushed or moved through the prepared curved path.

According to a further aspect, the path runs in a material. In this case, the path preparation system includes an ablation system. The ablation system is configured to stabilize a wall of the path at least in parts.

The material may be configured as described above. For example, the material may be tissue.

The path may be stabilized by the ablation system strengthening the wall of the path at least in parts. The material strength at the wall of the path may be increased at least in parts by the ablation system. The wall of the path here describes the material that surrounds the path. For example, the wall of the path may be a tunnel or a hollow cylinder. For example, at least part of the wall of the path may form a wall for the above-described channel.

In the case of an asymmetrical tip of the device, the ablation system may stabilize the wall on a predetermined side of the device corresponding to the asymmetry of the tip. In this case, the tip may be beveled on one side, for instance.

In certain embodiments the ablation system may also be configured to smooth the wall of the path. The wall may be smoothed such that the device may slide along the wall.

By stabilizing at least part of the wall of the path it is possible to prevent the device from "breaking out" of the path. The stabilization may strengthen guidance of the device along the path. The device is thereby guided not only by the perforation produced by the lesions or focus positions but also by the stabilization or strengthening of the wall of the path. by selective stabilization of at least subsegments of the wall, it is also possible to prevent the device from breaking out of the path or the channel and, for instance, injuring an organ or other critical regions. This may take place, for example, by stabilizing the wall that separates the path from the critical region. It is thereby possible to reduce or avoid material damage, For example tissue damage.

A path prepared in this way may also be used again subsequently. By stabilizing the wall, the path may remain intact over a prolonged time period. It is hence possible to reuse the same path, for instance for an inspection intervention in the same target region at an interval of time after the intervention. This may avoid injuring the tissue again. In addition, the risks in the subsequent intervention may be reduced if a pre-existing path is used for which no bleeding or other injuries, for instance to an organ, occurred. It is thereby possible to ensure reproducibility of the intervention because the intervention may be performed similarly multiple times. For example, the path may be prepared also as part of brachytherapy. In this case, the device may include a radiation source. Over the course of a plurality of treatment cycles, the radiation source must advantageously always be positioned at the same site, the target position. For this purpose, a path as described above may be used multiple times during the various treatment cycles, and it is thereby possible to ensure reproducibility of the radiation distribution by the radiation source. the stabilized wall may be visible in an imaging, thereby simplifying a new path planning process.

According to a further aspect, the ablation system is arranged at a tip of the device. In this case, the ablation system is based on one of the following techniques: heat ablation by microwaves or radio waves or electrical resistance, or laser ablation or rotablation.

The tip of the device here corresponds to the above-described tip. For example, the ablation system may be arranged on the tip in such a way that by feeding-in or moving the device, the wall of the path on which the device is moving is stabilized.

For this purpose, the ablation system may be based on heat ablation. In this case, the material, for example the tissue, is stabilized by heating. The heat ablation may be performed by emitting microwaves and/or radio waves and/or by heating by an electrical resistance. The material may be heated by microwaves and/or radio waves. Alternatively, or additionally, the material may be heated by an electrical resistance heated by a current flow.

Alternatively, the ablation system may be performed on the basis of laser ablation. In this case, the material may be stabilized by a pulsed laser beam. For this purpose, the ablation system at the tip of the device emits the pulsed high-intensity laser beam. The laser beam results in heating or warming of the material and hence to stabilization of the material. The laser ablation may be carried out in feedback with optoacoustics.

Alternatively, the ablation system may be based on rotablation. For this purpose, the tip of the device includes a rapidly rotating region. For example, the tip may be slightly asymmetrical for this purpose. The asymmetrical tip may move along the existing direction of curvature of the path. The path may be perforated at least in parts up to the focus position. The rotablation may damage the material in a targeted manner and thereby cause hardening or stabilization or strengthening of the material.

In embodiments the ablation system may be activated for example only when the device is meant to be prevented from "breaking out" of the path. For example, the ablation system may be activated in proximity to a critical region in order to prevent the device from "breaking out" or "sliding off" when being fed in or moved into the critical region.

The wall of the path may be additionally strengthened by established ablation techniques. This allows the same path to be reused and may prevent the device from "breaking out" of the path. The path may be made visible in a medical image in this manner.

According to a further aspect, the path preparation system is configured to prepare a plurality of paths for a plurality of devices simultaneously or iteratively. In this case, the tracking system is configured to determine the current position for each device of the plurality of devices on the corresponding path. The ultrasound transmitter is configured to focus one or more ultrasound waves onto at least one focus position, that lies in front of one of the devices in the direction of a path, in spatial relation to the current position of the associated device. The ultrasound transmitter simultaneously or iteratively prepares all the paths of the plurality of devices according to the plurality of current positions.

For example, a path is prepared for each device of the plurality of devices. For example, the path preparation system may be used to prepare a plurality of paths. For example, each device is hence assigned a corresponding path. The tracking system is used here to determine for each device the current position on the corresponding path or relative to the corresponding path. For each current position, a focus position may then be arranged or be determined in the corresponding spatial relation.

The high-intensity focused ultrasound wave may be emitted onto at least one of the focus positions. For example, more than one high-intensity focused ultrasound wave may be emitted onto more than one focus position, For example onto all the focus positions.

For example, the above-described method may be implemented iteratively or sequentially in time for the plurality of devices. In this context, "iteratively" means for example that the paths of the various devices of the plurality of devices are prepared in alternation by the ultrasound transmitter. In other words, "iteratively" means in this context that the ultrasound transmitter emits in alternation high-intensity focused ultrasound waves onto focus positions on the plurality of paths in spatial relation to the corresponding current positions on the paths.

For example, "iteratively" may mean that in a first step, successively for all the devices, a high-intensity focused ultrasound wave is focused and emitted onto a first focus position, and the devices are moved to the corresponding focus position. In a second step, high-intensity focused ultrasound waves may be focused and emitted onto a new focus position in spatial relation to the respective current positions of the devices on the corresponding paths. This may be repeated until all the devices have reached their target position. If one or more devices need fewer iterations or steps to reach the target position than others, the method is continued for the other devices until all the devices have reached their target position. The method performed by the path preparation system may be interrupted if one of the aforementioned events occurs.

Alternatively, "iteratively" may mean that the tracking system is used to select from the plurality of paths, a path on which lies the focus position onto which the high-intensity focused ultrasound wave is meant to be emitted or focused next. For example, in this case, the selection of the path may depend on all the current positions of the plurality of devices. For example, if at least some of the devices each include a radiation source for brachytherapy, the paths of the devices may be prepared so as to achieve a desired radiation distribution or dose distribution. The selection of the path on which the next focus position lies may depend on the desired radiation distribution and hence on the current position of the other devices. The current positions of the devices may be determined and checked by the tracking system. For example, the current positions may be checked on at least one medical image captured by the tracking system. On the basis of all the current positions, all the paths are iteratively prepared such that all the devices reach their target position. The method performed by the path preparation system may be interrupted if one of the above-described events occurs.

For example, path planning for the plurality of paths may be adjusted by the tracking system at any time in each step or in each iteration.

Alternatively, the plurality of paths may be prepared simultaneously. This takes place by emitting a plurality of high-intensity focused ultrasound waves simultaneously onto the corresponding plurality of focus positions on the plurality of paths. Thus, each individual path is prepared as described above. In this case, the focus positions may be adjusted to suit one another, or coordinated with one another, before the respective ultrasound waves are emitted.

For example, the paths may be prepared iteratively and simultaneously in alternation. If the paths need to be finely coordinated with one another, for instance in, or close to, a critical region, the paths may be prepared iteratively. In a non-critical region, the paths may be prepared simultaneously in order to speed up the method.

For example, the plurality of devices may include the same design. For example, all the devices may include a guide instrument for inserting a radiation source, for instance for brachytherapy. Alternatively, all the devices may be in the form of catheters. Alternatively, all the devices may be in the form of biopsy needles. Alternatively, at least one of the plurality of devices may include a different design from the other devices of the plurality of devices.

A guide instrument for inserting a radiation source for brachytherapy may be connected for example to an afterloader. The robotic system includes the afterloader. For example, the guide element may be moved along the path by the afterloader. The afterloader controls the feeding-in or movement of the radiation source in the guide instrument along the path. The afterloader may be configured to slide, or move, or feed-in the radiation source up to the tip of the device, for example of the guide instrument, once the tip of the device has reached the target position. If more than one device is in the form of a guide instrument for inserting a radiation source, all the devices that are in the form of a guide instrument for inserting a radiation source may be connected to the afterloader.

The above-described path preparation system may be used to prepare a plurality of paths iteratively or simultaneously. It is thereby possible to adjust the paths to suit one another. this is highly advantageous for example in brachytherapy in order to adjust or correct a radiation distribution or dose distribution at any time. For example, the paths may be adjusted so as to achieve a planned (spatial) dose distribution. For example, the paths may be corrected or adjusted when, for example, one of the paths cannot be prepared as planned, for instance because a critical region is unexpectedly preventing preparation of the planned path, or if a planned path may no longer be implemented as a result of a patient movement or organ movement. it is thereby possible to adjust the radiation distribution in three-dimensional space by correcting the paths. In the case of flexible guide instruments, these follow the prepared path. The optimum dose distribution may thereby be achieved when the radiation source is moved in the guide instrument in accordance with a radiation plan. For example, once the paths are prepared in the material, for example in the tissue, the guide instruments may be arranged again along the same paths, for instance a short time after the first treatment or when the patient is repositioned.

According to an aspect, the path preparation system includes a robotic system for controlling a movement of the device. The robotic system is configured to adjust a deformation of the device to suit the spatial relation.

The robotic system may correspond to the robotic system described above.

The movement of the device is configured here as described above. For example, the movement is described by the speed and/or the direction of the device. The robotic system is configured for example to provide feeding-in of the device. For example, the robotic system moves the device forwards along the prepared path. The robotic system may define here for example the speed of the movement. The direction of the movement may be defined for example at least in part by the prepared path or the focus position or the spatial relation. In order to follow the direction, the robotic system may be configured to deform the device in such a way that it may follow the direction particularly easily. For this purpose, the device may include a tip that may be shaped into a curve, as described above. The robotic system may then curve the tip towards the focus position. The deformation describes for example a curvature or orientation of the tip of the device. The optimum deformation of the device in order to follow the prepared path thus depends on the focus position in relation to the current position. The optimum deformation depends on the spatial relation. The curvature or orientation or deformation of the tip of the device is thus adjusted to suit the spatial relation.

After the emission of the high-intensity focused ultrasound wave, the robotic system may move the device from the current position to the focus position.

The device may be moved by a robotic system. the device may be fed in more easily by adjusting the curvature of the tip of the device to suit the prepared path or to suit the focus position. it is thereby possible to reach the target position more quickly. it is also possible to prevent unnecessary damage to the material, for example to the tissue, caused by an incorrect orientation or curvature of the device.

In alternative embodiments, the device may be moved manually. For example, the deformation of the device may be adjusted manually to suit the spatial relation. For example, the adjustment may be based on a medical image. The adjustment may be performed, for instance, by a doctor or by a medical assistant.

According to a further optional aspect, the robotic system is configured to pull back the device before the emission of the ultrasound wave.

Pulling-back means that the distance between the tip of the device and the focus position is increased. For example, the device is pulled back after the current position is determined. The device is pulled back in such a way, for example to such an extent, that damage to the device by the high-intensity focused ultrasound wave may be ruled out. For example, the device is pulled back along the path already traveled. For example, the device may be pulled back by 1 mm, 2 mm, 5 mm, 1 cm.

A short distance between the current position and the focus position may thereby be selected without there being a risk of damage to the device by the high-intensity focused ultrasound wave. as a result of the shorter distance that may thereby be achieved between the current position and the focus position, finer or more exact preparation of the path is possible. For example, the path may be perforated more finely. This may avoid unnecessary damage to the material, for example to the tissue, by distances that are too large between the current position and the focus position and a resultant break-out of the device from the path. For example, it may be ensured that the device may follow the path as easily as possible when the distance between the current position and the focus position is as small as possible.

Embodiments also include to a method for preparing a path of a device using an above-described path preparation system. The method includes a step of determining a current position of the device on the path by the tracking system. The method also includes a step of determining the focus position, that lies in front of the device in the path direction, in spatial relation to the current position of the device.

The method is implemented by the above-described path preparation system.

In the step of determining the current position, the current position of the device is determined by the tracking system as described above. For example, the current position may be determined on the basis of a medical image captured by the tracking system.

In the step of determining the focus position, the focus position is determined on the basis of the spatial relation under the above-described conditions. For example, the focus position may be determined in an automated manner on the basis of the above-described spatial relation. Alternatively, or additionally, determining the focus position may include defining the spatial relation and/or the focus position manually.

The method may also include a step of emitting by an ultrasound transmitter an ultrasound wave focused onto the focus position.

In the step of emitting the focused ultrasound wave, the ultrasound transmitter emits a high-intensity ultrasound wave focused onto the focus position. In this process, the ultrasound wave may produce a lesion that has a reduced material strength.

In a step, the device may be moved or fed in from the current position to the focus position.

The steps may be repeated iteratively until the device has reached the above-described target position in the target region.

For example, the method may be implemented in parallel for a plurality of devices for preparing a corresponding plurality of paths as described above.

The path preparation system may be used to prepare a path to a target position quickly and flexibly. risks during preparation of the path may thereby be reduced as described above. The device may be rigid or flexible. the device may include a blunt tip in the method. By the method, the path may be adjusted or corrected flexibly in each iteration step or each iteration or each step.

DETAILED DESCRIPTION

Figure 1:
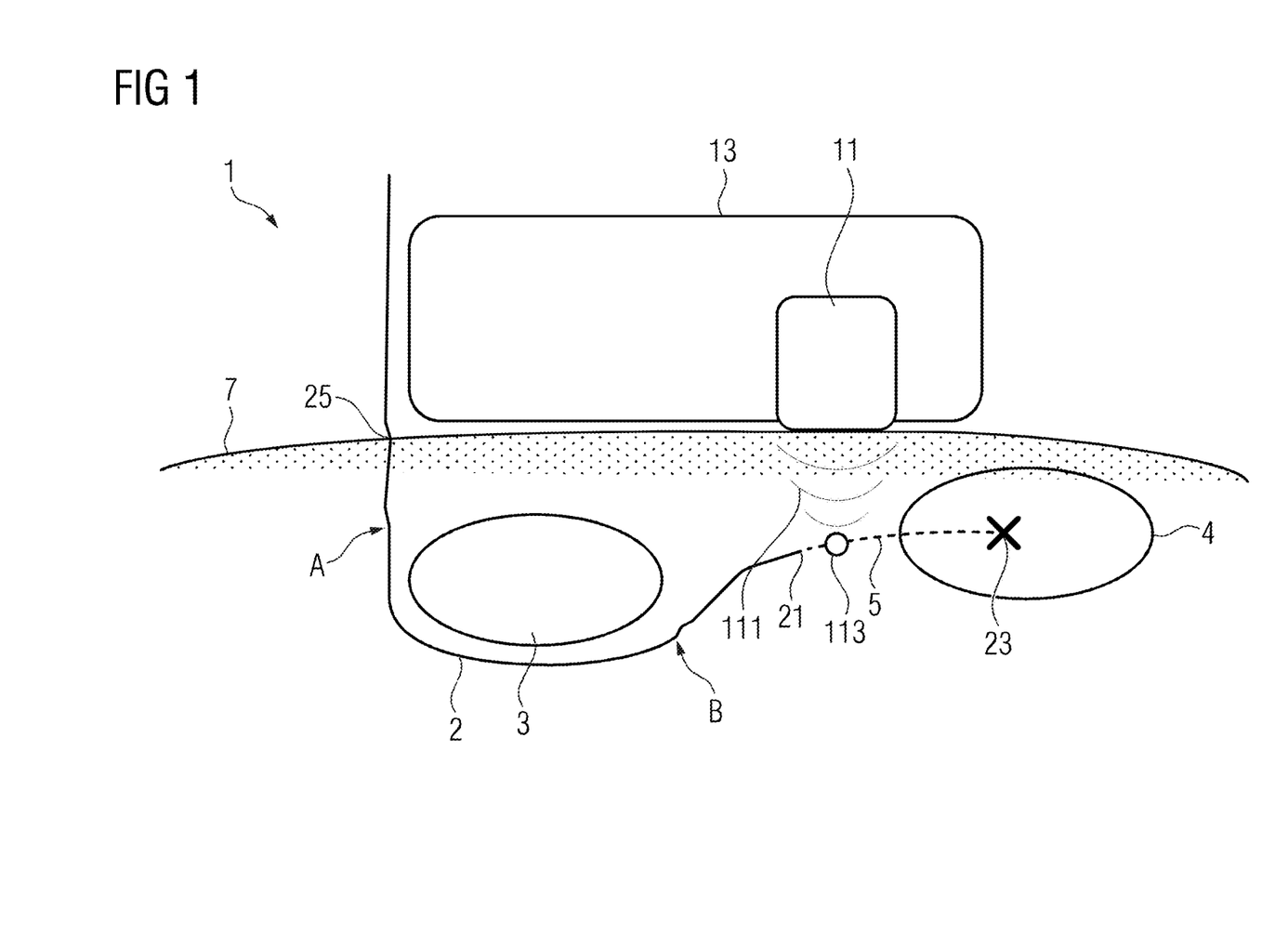
FIG. 1 depicts an embodiment of a path preparation system for preparing a path for a device.

FIG. 1 depicts an embodiment of a path preparation system 1 for preparing a path 5 for a device 2.

The path preparation system 1 includes an ultrasound transmitter 11 and a tracking system 13.

The tracking system 13 is configured to determine a current position 21 of the device 2 on the path 5. The tracking system 13 is configured to determine the current position 21 of the device 2. For example, the tracking system 13 is configured to determine the current position 21 of the device 2 relative to the path 2. For example, the tracking system 13 may be configured to determine a deviation of the current position 21 of the device 2 with respect to the path 5 if the path 5 is preplanned.

In embodiments the tracking system 13 may be configured to detect or determine a direction and/or a speed of the device 2. The direction and the speed may equal here the direction and speed respectively at which the device 2 reaches the current position 21.

In the embodiment shown, the tracking system 13 includes an ultrasound unit. Alternatively, or additionally, the tracking system 13 may include, for example, a C-arm unit and/or an angiography unit. The tracking system 13 may determine the current position 21 of the device 2 by imaging using one of the aforementioned units. For example, the current position 21 of the device 2 is then determined in a medical image captured by the imaging. If the tracking system is configured to determine the direction and/or speed of the device 2, the determining may be based on a plurality of medical images. In this case, the plurality of medical images may include a temporal series or sequence of medical images.

In embodiments of the tracking system 13, the tracking system 13 may determine the current position 21 by optical tracking or by electromagnetic tracking.

The current position 21 corresponds to the position of a tip of the device 2. The tip of the device 2 is that part of the device 2 that has already been moved or fed in by the furthest distance along the path 5. The tip of the device 2 is that part of the device that is closest to a target position 23. In embodiments the current position 21 may include information about a curvature or orientation of the tip of the device 2.

The path 5 may run for example through a material or in a material. In the figure, the region below the surface 7 describes the material. The start of the region of the material is indicated by a dotted pattern. The path 5 leads from a starting point 25 to the target position 23. The target position 23 lies in a target region 4. In the target region 4, an intervention may be performed using the device 2. The path may be configured 5 to detour around a critical region 3. The path 5 may be configured such that the device 2 does not cross the critical region 3 when it is moved along the path 5. Damage to the critical region 3 may thereby be prevented. The critical region 3 may be a region having an increased risk of bleeding or an organ, for example. The critical region 3 may define a critical segment AB of the path 5. The segment of the path 5 that adjoins the critical region 3 may count as the critical segment AB. The path 5 may be determined in advance. In other words, path planning may be performed in advance, in that process the path 5 or the course of the path 5 is determined. The path 5 may be preplanned. In this process, one or more critical segments AB may be marked on the path 5.

The material may be tissue. For example, the material may be human or animal tissue.

The device 2 may be rigid or inflexible. Alternatively, the device 2 may be flexible. The device 2 may then be a medical device for example. For example, the device 2 may be configured for sample-taking, for example a biopsy, or for drainage, or for catheterization, or for a transjugular intrahepatic portosystemic shunt (TIPS) procedure in a liver, or for a surgical procedure, or for cannulation in endoscopic retrograde cholangiopancreatography (ERCP), or for placing a stent, or for placing trocars during a laparoscopy, or for brachytherapy etc. in the target region 4. Then the intervention may accordingly be sample taking, for example a biopsy, or drainage, or catheterization, or a transjugular intrahepatic portosystemic shunt (TIPS) procedure in a liver, or a surgical procedure, or cannulation in endoscopic retrograde cholangiopancreatography (ERCP), or placing a stent, or placing trocars during a laparoscopy, or brachytherapy. The device 2 is configured to be moved or fed in from the starting point 25 to the target position 23 along the path 5. The device 2 may be elongated for this purpose. For example, the device 2 may be cylindrical. For example, the height of the cylinder encompassing the device may be larger than the diameter of the base surface. For example, the height may be ten times, twenty times, fifty times, or one hundred times the diameter of the base surface. The device 2 may be arranged on a guidewire. For example, the device 2 may include a blunt tip or a sharp tip. In embodiments, the tip may be asymmetrical. Alternatively, or additionally, the tip may be formed into a curve. In other words, a curvature of the tip may be adjusted automatically or manually.

If the device 2 is flexible, it may follow a curved path course. If the device is rigid 2 and the path 5 runs in a curve, the material may be deliberately deformed by the device 2 being fed in along the curved path 5.

In embodiments the device 2 may be a biopsy needle. The biopsy needle is configured to take a sample in the target region 4. The sample may be a sample of material, For example a tissue sample.

The ultrasound transmitter 11 is configured to emit a high-intensity focused ultrasound wave 11 onto a focus position 113. The focus position 113 lies at the focus of the ultrasound wave 111. The focus position 113 lies in spatial relation to the current position 21 of the device 2 on the path 5. For example, the focus position 113 may be at a defined distance from the current position 21. The spatial relation may then set the defined distance. Alternatively, the focus position 113 may be preset as part of the path planning. Thus, the spatial relation may be preset as part of the path planning. For example, the defined distance may equal a distance of 0.5 cm, 1 cm or 2 cm. The focus position 113 may be arranged on the path 5 at a distance of, for example, 0.5 cm or 1cm or 2 cm from the current position 21.

If the direction and/or the speed of the device 2 has been determined, the spatial relation may depend on the direction and/or speed of the device 2. For example, the focus position 113 may be arranged such that the device 2 reaches the focus position 113 in a defined time, assuming the determined speed. For example, the focus position 113 may be arranged in spatial relation to the current position 21 such that the device 2 reaches the focus position in 0.1 s or in 0.5 s or in 1 s, assuming movement or feeding-in at the determined speed. If the direction of movement of the device 2 has been determined, the spatial relation may define a maximum deviation between the direction of the device 2 and a direction between the current position 21 and the focus position 113. This may prevent the device 2 from kinking too severely or may prevent too severe deformation of the material.

In embodiments the spatial relation and/or the focus position 113 may be defined manually. The defined distance of the focus position 113 from the current position 21 and/or the defined time until reaching the focus position 113 and/or the maximum deviation between the direction of the device 2 and the direction of a connection between focus position 113 and current position 21 may be defined manually as the spatial relation. For example, a fixed point or a fixed position on the path 5 may also be manually definable as the focus position 113. In this case, an operator or user may manually define the spatial relation and/or the focus position 113. The operator may be, For example, a doctor and/or a medical staff member or assistant. The operator may define the spatial relation and/or the focus position 113 via an input unit. For example, the input unit may be a keyboard, a computer mouse, a touchscreen and/or a touchpad. The operator may define the spatial relation for example on the basis of the medical image.

In embodiments a histotripsy system may include the ultrasound transmitter 11. In embodiments the ultrasound transmitter 11 may be part of a histotripsy system. The histotripsy system includes an ultrasound imaging transducer and an ultrasound therapy transducer. For example, the ultrasound transmitter 11 may be equivalent to the ultrasound therapy transducer of the histotripsy system. For example, the tracking system 13 may be equivalent to, or include the ultrasound imaging transducer.

In embodiments the ultrasound transmitter 11 and the tracking system 13 may be registered to each other. The tracking system 13 may also include an ultrasound imaging unit. "Registered" means here that the ultrasound transmitter 11 and the tracking system 13 are spatially aligned with each other. The tracking system 13 may be aligned such that it captures a medical image that depicts the current position 21 and the focus position 113. For example, the ultrasound transmitter 11 may then be focused automatically onto the focus position 23, that is in spatial relation to the current position 21 determined using the tracking system 13. For example, a histotripsy system may then include the tracking system 13 and the ultrasound transmitter 11, as described above.

In embodiments the tracking system 13 may be configured to capture movement of the critical region 3. The critical region 3 may be an organ, for instance. For example, the tracking system 13 is then configured to capture an organ movement. For example, the tracking system 13 is configured to capture a phase or state of the organ movement. The organ movement or the phase of the organ movement may be determined, for example, on the basis of a medical image captured using the tracking system. Alternatively, the organ movement or the phase of the organ movement may be derived from physiological parameters of a patient, in whom the path runs, that are captured using the tracking system. For example, the organ movement or the phase of the organ movement may be derived or determined from an electrocardiogram. For this purpose, the tracking system may capture an electrocardiogram. The high-intensity focused ultrasound wave 111 may then be emitted according to the phase of the organ movement. The emission of the high-intensity focused ultrasound wave 111 may be adjusted to suit the organ movement. For example, motion correction of the organ movement may thereby be performed for the emission of the high-intensity focused ultrasound wave 111.

In embodiments the high-intensity focused ultrasound wave 111 is emitted by the ultrasound transmitter 11 only if none of the following events occurs: the current position 21 corresponds to the target position 23, and/or the segment of the path 5 on which the focus position 113 lies is marked as critical, and/or a user input prevents the emission of the ultrasound wave 111. When the current position 21 corresponds to the target position 23, the device 2 has traveled the entire path 5. Therefore, it is unnecessary to continue emission of an ultrasound wave 111. In a critical segment AB of the path 5, it may make sense for the ultrasound wave 111 to be emitted manually rather than in an automated manner, in order to avoid injuries or damage. For example, it may make sense to prepare the path 5 in another way in a critical segment AB. A user input by the operator may prevent the emission of the ultrasound wave 111. A safeguarding system may be provided in this manner.

In embodiments the high-intensity focused ultrasound wave 111 produces a lesion in the material. The lesion is produced at the focus position 113. The material exhibits a reduced or lower material strength at the lesion. For example, the ultrasound wave 111 may liquefy and/or displace the material. In embodiments, for example at least a portion of a channel from the current position 21 to the focus position 113 may be formed by the lesion. The channel may include the entire region of the path 5 between the current position 21 and the focus position 113. Alternatively, the channel may include only part of this segment. The channel is configured such that the device 2 may be moved or fed in easily from the current position 21 to the focus position 113. The channel may define the direction of the movement or feeding-in of the device 2 along the path 5.

In embodiments the path 5 may be prepared using a plurality of lesions at a plurality of focus positions 113. The plurality of lesions may perforate the path 5. The device 2 may thereby be moved easily along the path 5.

For example, the device 2 may be moved forwards iteratively. After the emission of the ultrasound wave 111, the device 2 may be moved from the current position 21 to the focus position 113. The focus position 113 then corresponds to the new current position 21. A new ultrasound wave 111 may then be emitted to a new focus position 113. The new focus position 113 lies in spatial relation to the new current position 21 on the path 5. The path 5 may be prepared in this manner up to the target position 23. The last focus position 113 and the last current position 21 may then correspond to the target position 23.

In embodiments the path preparation system 1 may include an ablation system. The ablation system is configured to stabilize a wall of the path 5 at least in parts. The ablation system is configured to stabilize a wall of the channel at least in parts. For example, the wall may be stabilized according to an asymmetry of the tip of the device 2. In other words, only one side of the wall relative to the device 2 may be stabilized according to an asymmetry of the tip. For example, the wall may be stabilized by strengthening the material or increasing the material strength. The wall may be stabilized at least in parts. For example, the wall may be stabilized in the direction of a critical region 3. It is thereby possible to prevent the device 2 from breaking out of the path 5 into the critical region 3. In embodiments the ablation system may be arranged on the tip of the device. It may be based on one of the following techniques: heat ablation (by microwaves or radio waves or electrical resistance), laser ablation or rotablation. A path prepared in this way may be reused. In addition, the stabilized wall may be visible in a medical image.

For example, the wall may also be smoothed by the ablation system. The device 2 may thereby slide along more easily in the prepared path 5.

In embodiments the device 2 may be moved or fed in by a robotic system. For example, the robotic system may define a speed of movement of the device 2. If the device 2 has a tip that may be formed into a curve, the robotic system may be configured to adjust the curvature of the tip or to deform the device 2 such that the orientation of the tip resulting from the curvature is adjusted to suit the focus position 113, or to suit the spatial relation between the current position 21 and the focus position 113. The tip of the device 2 may be curved by the robotic system such that it is oriented towards the focus position 113. On the one hand, the direction of movement of the device 2 may thus be defined by the focus position 113 or the spatial relation, and on the other hand, the direction of the device 2 may be defined by an orientation or curvature of the tip. The direction of movement of the device 2 may be defined at least in part by the robotic system. The robotic system is thus configured to adjust a deformation of the device 2 to suit the spatial relation. The deformation of the device 2 is described by the curvature or orientation of the tip.

In embodiments the robotic system may pull back the device 2 along the already-traveled path 5 before the emission of the high-intensity focused ultrasound wave. The robotic system may increase the distance between the focus position 113 and the tip of the device 2. For example, the device 2 may be pulled back after the current position 21 is determined. For example, the device 2 is pulled back to such an extent that it is not damaged by the ultrasound wave 111.

For example, the robotic system may pull back the device 2 by 1 mm, 2 mm, 5 mm, or 1 cm.

Alternatively, the device 2 may be moved manually.

Figure 2:
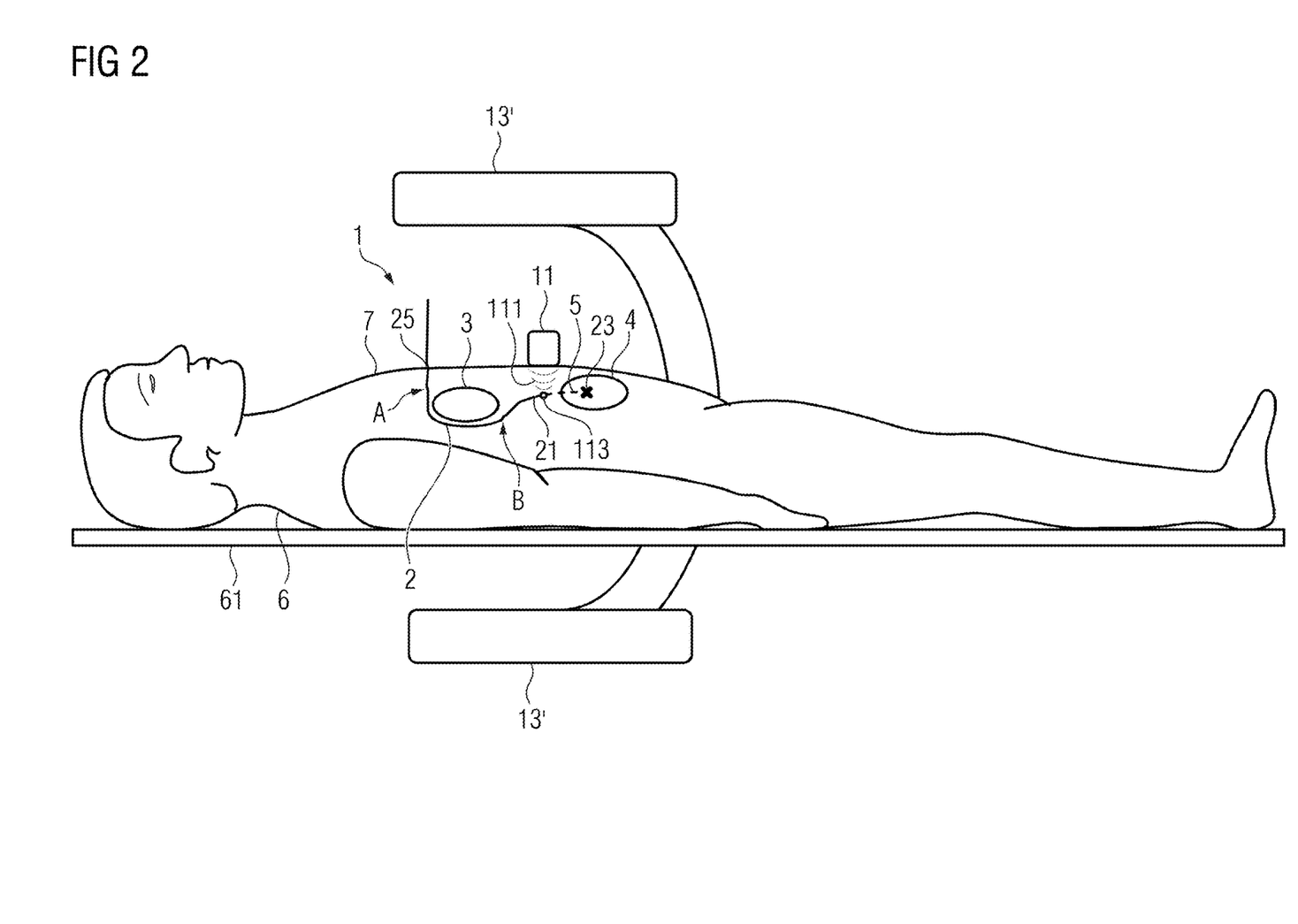
FIG. 2 depicts an embodiment of a path preparation system for preparing a path for a device.

FIG. 2 depicts an embodiment of a path preparation system 1 for preparing a path 5 for a device 2.

The path preparation system 1 corresponds to the path preparation system 1 described in the description relating to FIG. 1. The tracking system 13' includes a C-arm unit. The medical image for determining the current position 21 is captured using the C-arm unit.

The intervention is carried out on a patient 6, by way of example. The patient 6 is arranged or positioned on a patient couch 61 in the C-arm unit.

Figure 3:
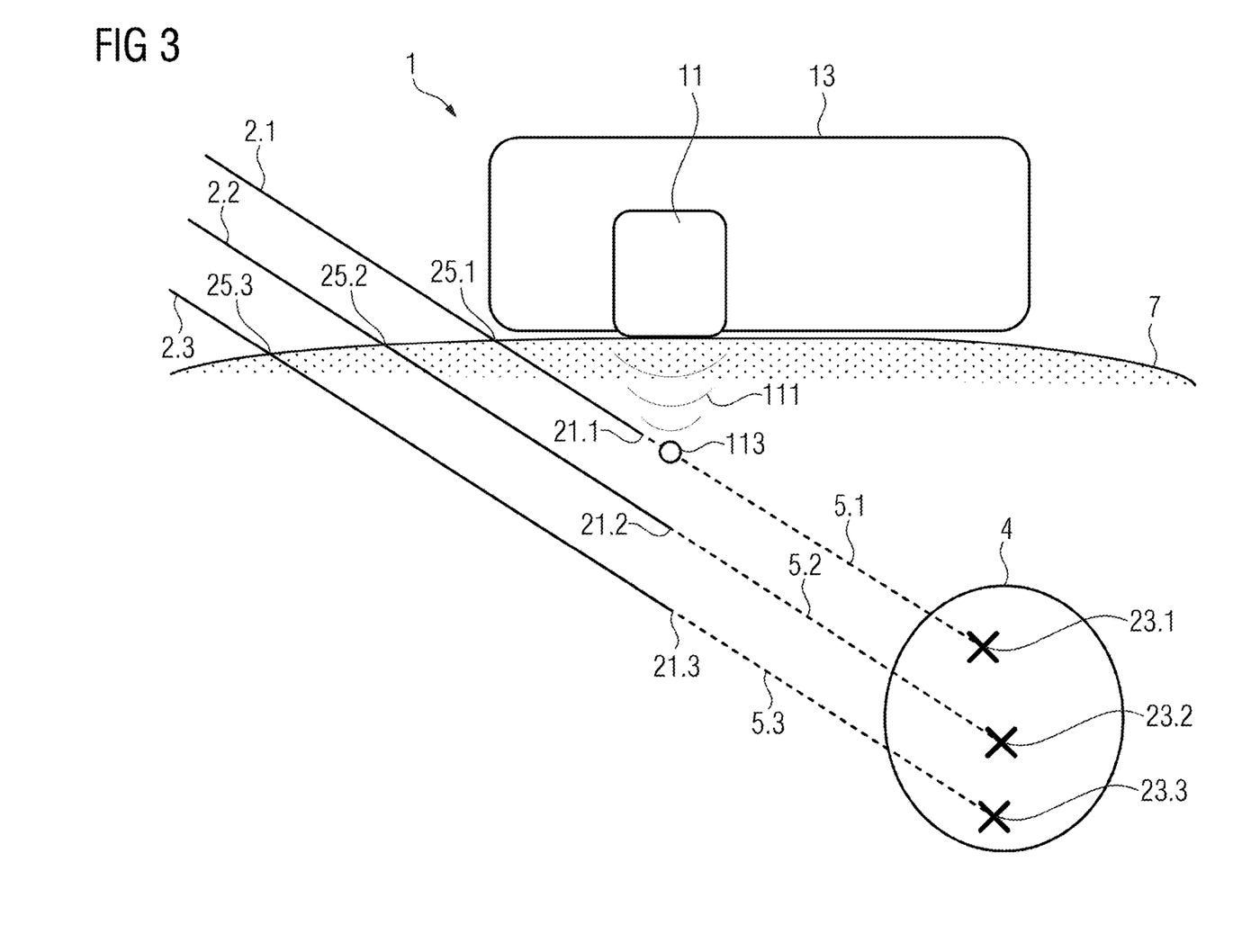
FIG. 3 depicts an embodiment of a path preparation system for preparing paths for a plurality of devices.

FIG. 3 depicts an embodiment of a path preparation system 1 for preparing paths 5.1, 5.2, 5.3 for a plurality of devices 2.1, 2.2, 2.3.

The path preparation system 1 is configured to prepare a plurality of paths 5.1, 5.2, 5.3 for a plurality of devices 2.1, 2.2, 2.3. Each individual path 5.1, 5.2, 5.3 is prepared as described in the description of the embodiment with reference to FIG. 1.

The devices 2.1, 2.2, 2.3 are also configured in accordance with the description relating to FIG. 1. At least some of the devices 2.1, 2.2, 2.3 may differ in design. Alternatively, all the devices 2.1, 2.2, 2.3 may be identical or have the same design.

The tracking system 13 is configured to determine for each device 2.1, 2.2, 2.3 the corresponding current position 21.1, 21.2, 21.3. In the embodiment, the tracking system 13 has a similar design to the embodiment shown in FIG. 1. Alternatively, the tracking system 13 may include a design that corresponds to the embodiment shown in FIG. 2. Alternatively, according to a further alternative embodiment, the tracking system 13 may also be configured as described in relation to FIG. 1.

Each device 2.1, 2.2, 2.3 is meant to be moved or fed in along the corresponding path 5.1, 5.2, 5.3 to a target position 23.1, 23.2, 23.4 in the target region 4.

This may be relevant for example for brachytherapy. In the case of brachytherapy, a radiation source is arranged on each device 2.1, 2.2, 2.3. For example, the radiation source is arranged on the tip of each device 2.1, 2.2, 2.3. Suitable positioning of the radiation sources in the target region 4 may produce a radiation distribution or dose distribution that may be used for tumor treatment in the target region 4.

In order to prepare the plurality of paths 5.1, 5.2, 5.3, a high-intensity focused ultrasound wave 111 is emitted iteratively by the ultrasound transmitter 11 onto a focus position 113 on one of the paths 5.1, 5.2, 5.3. The ultrasound waves 111 are emitted until all the devices 2.1, 2.2, 2.3 have reached their target position 23.1, 23.2, 23.3 or one of the above-described events occurs that prevents emission of the ultrasound wave 111. The paths 5.1, 5.2, 5.3 are hence prepared iteratively.

"Iteratively" may mean here that first an ultrasound wave 111 is emitted onto the focus position 113 in spatial relation to the current position 21.1 of the first device 2.1. The first device 2.1 may then be moved from its current position 21.1 to the focus position 113. Following this, an ultrasound wave 111 is emitted onto a focus position in spatial relation to the current position 21.2 of the second device 2.2, that may be moved from its current position 21.2 to the focus position. The same may be repeated for each device. Then it begins again with the first device 2.1, and a new ultrasound wave 111 is emitted onto a new focus position on the path 5.1 of the first device 2.1.

Alternatively, "iteratively" may mean that the devices 2.1, 2.2, 2.3 are moved in no fixed order. The ultrasound wave 111 is not emitted in any fixed order in spatial relation to the corresponding current positions 21.1, 21.2, 21.3 of the individual devices 5.1, 5.2, 5.3. For example, in this case, the order may depend on a present radiation distribution if the devices 2.1, 2.2, 2.3 each include at least one radiation source for brachytherapy. The paths 5.1, 5.2, 5.3 may be adjusted at any time depending on the radiation distribution in order to achieve an optimum radiation distribution or dose distribution in the target region 4.

Alternatively, the paths 5.1, 5.2, 5.3 may be prepared simultaneously. In this case, in one step, a plurality of high-intensity focused ultrasound waves 111 are emitted onto the plurality of focus positions 113 on the plurality of paths 5.1, 5.2, 5.3. All the paths 5.1, 5.2, 5.3 of the plurality of paths 5.1, 5.2, 5.3 are thereby prepared simultaneously as described in the description relating to FIGS. 1 and 2.

For example, the paths 5.1, 5.2, 5.3 may be prepared iteratively and simultaneously in alternation.

Figure 4:
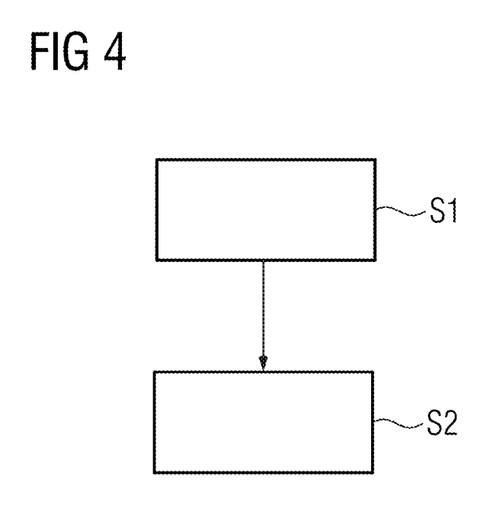
FIG. 4 depicts an embodiment of a method for preparing a path of a device using a path preparation system.

FIG. 4 depicts an embodiment of a method for preparing a path 5, 5.1, 5.2, 5.3 of a device 2, 2.1, 2.2, 2.3 using a path preparation system 1.

In a step of determining S1 a current position 21, 21.1, 21.2, 21.3, the current position 21, 21.1, 21.2, 21.3 of a device 2, 2.1, 2.2, 2.3 on the path 5, 5.1, 5.2, 5.3 may be determined by a tracking system 13, 13'. The device 2, 2.1, 2.2, 2.3 together with its current position 21, 21.1, 21.2, 21.3, the path 5, 5.1, 5.2, 5.3, and the tracking system 13, 13' may be configured as described with reference to FIGS. 1 to 3. The current position 21, 21.1, 21.2, 21.3 may be determined for example relative to a path 5, 5.1, 5.2, 5.3 on which the device 2, 2.1, 2.2, 2.3 is meant to be moved. The current position 21, 21.1, 21.2, 21.3 may be determined for example in a medical image captured by a tracking system 13, 13'. For example, in the step of determining S1, the current position 21, 21.1, 21.2, 21.3 may be determined for each device of a plurality of devices 2, 2.1, 2.2, 2.3.

In a step of determining S2 the focus position 113, that lies in the direction of the path 5, 5.1, 5.2, 5.3, the focus position 113 is determined in spatial relation to the current position 21, 21.1, 21.2, 21.3. The spatial relation is configured here as described with reference to FIGS. 1 to 3. The focus position 113 lies on the path 5, 5.1, 5.2, 5.3. For the case that a plurality of current positions 21, 21.1, 21.2, 21.3 have been determined for a plurality of devices 2, 2.1, 2.2, 2.3, in the method step of determining S2 a focus position 113, a focus position 113 may be determined iteratively, as described with reference to FIG. 3, for each device 2, 2.1, 2.2, 2.3 according to the corresponding current position 21, 21.1, 21.2, 21.3 or the path 5, 5.1, 5.2, 5.3.

In a step of emitting an ultrasound wave 111 focused onto the focus position 113, the ultrasound wave 111 is emitted by an ultrasound transmitter 11. For example, the emission S3 of the high-intensity focused ultrasound wave 111 is performed as described in the description relating to FIGS. 1 to 3. If in the step of determining S2 the focus position 113, more than one focus position 113 has been determined, a plurality of high-intensity focused ultrasound waves 111 are emitted iteratively or "in parallel", as explained in the description relating to FIG. 3. The ultrasound waves 111 are then focused onto the various focus positions 113.

The method may include a step of moving the device 2, 2.1, 2.2, 2.3 from the current position 21, 21.1, 21.2, 21.3 to the focus position 23, 23.1, 23.2, 23.3. In this case, the focus position 23, 23.1, 23.2, 23.3 corresponds to the new current position 21, 21.1, 21.2, 21.3 of the device 2, 2.1, 2.2, 2.3.

The described method may be repeated iteratively until the current position 21, 21.1, 21.2, 21.3 corresponds to the target position 23, 23.2, 23.2, 23.3 , or until all the current positions 21, 21.1, 21.2, 21.3 correspond to the corresponding target position 23, 23.2, 23.2, 23.3.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A path preparation system for preparing a path for a device, the system comprising:
   a tracking system configured to determine a current position of the device on the path that runs in a material; and
   an ultrasound transmitter configured to focus an ultrasound wave onto a focus position that lies in front of the device in a direction of the path in spatial relation to the current position of the device, wherein the focused ultrasound wave produces at the focus position a lesion including a reduced material strength of the material, wherein the path is prepared according to the current position of the device by a plurality of lesions produced at a plurality of focus positions along the path.

2. The path preparation system of claim 1, further comprising a histotripsy system that includes the ultrasound transmitter.

3. The path preparation system of claim 1, wherein the tracking system comprises an imaging unit, wherein the imaging unit is one of the following units: a C-arm unit, an angiography unit, or an ultrasound imaging unit.

4. The path preparation system of claim 1, wherein the tracking system comprises an ultrasound imaging unit, wherein the ultrasound imaging unit and the ultrasound transmitter are registered to each other.

5. The path preparation system of claim 1, wherein the tracking system is configured to determine a direction, a speed, or the direction and speed of movement of the device.

6. The path preparation system of claim 5, wherein the spatial relation of the focus position to the current position of the device depends on the speed, the direction, or the speed and the direction of movement of the device.

7. The path preparation system of claim 1, wherein the spatial relation, the focus position, or the spatial relation and the focus position are defined manually.

8. The path preparation system of claim 1, wherein the ultrasound wave is emitted onto the focus position only if none of the following events occurs:
   the current position of the device corresponds to a target position of the path;
   a segment of the path on which the current position lies is marked as critical in path planning; or
   a user input prevents the emission of the ultrasound wave.

9. The path preparation system of claim 1, wherein the device comprises a biopsy needle.

10. The path preparation system of claim 1, wherein the system further comprises:
    an ablation system configured to stabilize a wall of the path at least in parts.

11. The path preparation system of claim 10, wherein the ablation system is then arranged at a tip of the device, wherein the ablation system is based on one of the following techniques: heat ablation by microwaves or radio waves or electrical resistance, laser ablation, or rotablation.

12. The path preparation system of claim 1, wherein the path preparation system is configured to prepare a plurality of paths for a plurality of devices simultaneously or iteratively, wherein the tracking system is configured to determine the current position for each device of the plurality of devices on the corresponding path, wherein the ultrasound transmitter is configured to focus one or more ultrasound waves onto at least one focus position that lies in front of one of the plurality of devices in the direction of the corresponding path, in spatial relation to the current position of the respective device, wherein the ultrasound transmitter simultaneously or iteratively prepares all the paths (of the plurality of devices according to the plurality of current positions.

13. The path preparation system of claim 1, further comprising a robotic system for controlling a movement of the device, wherein the robotic system is configured to adjust a deformation of the device to suit the spatial relation.

14. The path preparation system of claim 13, wherein the robotic system is configured to pull back the device before the emission of the ultrasound wave.

15. A method for preparing a path of a device using a path preparation system, the method comprising:
    determining a current position of the device on the path by a tracking system; and
    determining a focus position that lies in front of the device in a direction of the path in spatial relation to the current position of the device; and
    focusing an ultrasound wave onto the focus position,
    wherein the focused ultrasound wave produces at the focus position a lesion including a reduced material strength, wherein the path is prepared for the device by repeatedly determining, determining, and focusing at current positions ahead of the device as the device moves along the path.

16. The path preparation system of claim 1, wherein the focused ultrasound wave is used to perforate the path by the plurality of lesions.

17. The path preparation system of claim 1, wherein the focus position is arranged on the path at a distance of 2 cm or less from the current position of the device.

18. The path preparation system of claim 1, wherein the focus position is arranged such that the device reaches the focus position in a defined time.

* * * * *